(12) United States Patent
Setton et al.

(10) Patent No.: US 9,911,222 B2
(45) Date of Patent: Mar. 6, 2018

(54) ANIMATION IN THREADED CONVERSATIONS

(71) Applicant: TangoMe, Inc., Mountain View, CA (US)

(72) Inventors: Eric Setton, Menlo Park, CA (US); Uri Raz, Palo Alto, CA (US); Ian Barile, Palo Alto, CA (US); Geoff Lee, Mountain View, CA (US); Jamie Odell, Foster City, CA (US); Huy Phan, San Jose, CA (US)

(73) Assignee: TangoMe, Inc., Mountain View, CA (US)

( * ) Notice: Subject to any disclaimer, the term of this patent is extended or adjusted under 35 U.S.C. 154(b) by 407 days.

(21) Appl. No.: 13/839,482

(22) Filed: Mar. 15, 2013

(65) Prior Publication Data

US 2014/0009475 A1    Jan. 9, 2014

Related U.S. Application Data

(60) Provisional application No. 61/668,811, filed on Jul. 6, 2012.

(51) Int. Cl.
    G06T 13/00    (2011.01)
    G06T 13/80    (2011.01)
    H04L 12/58    (2006.01)
    G06Q 30/00    (2012.01)

(52) U.S. Cl.
    CPC ............. *G06T 13/80* (2013.01); *G06Q 30/00* (2013.01); *H04L 51/08* (2013.01); *H04L 51/10* (2013.01); *H04L 51/16* (2013.01)

(58) Field of Classification Search
    CPC ................................. G06T 13/80; G06T 13/00
    USPC .......................................................... 345/473
    See application file for complete search history.

(56) References Cited

U.S. PATENT DOCUMENTS

| 4,846,206 | A  | 7/1989 | Peterson et al. |
| 6,182,010 | B1 * | 1/2001 | Berstis ............... G01C 21/3647 340/995.11 |
| 7,487,441 | B2 | 2/2009 | Szeto |
| 8,059,097 | B2 | 11/2011 | Duarte et al. |
| 8,255,810 | B2 | 8/2012 | Moore et al. |
| 8,824,645 | B2 | 9/2014 | Roberts et al. |

(Continued)

FOREIGN PATENT DOCUMENTS

| KR | 10-2004-0002828 | 1/2004 |
| KR | 10-2006-0047148 | 5/2006 |
| WO | 2007/008050 | 1/2007 |

OTHER PUBLICATIONS

"PCT/US2013/049401 Search Report and Written Opinion", dated Oct. 22, 2013, 10 pages.

(Continued)

*Primary Examiner* — Jin Ge

(57) ABSTRACT

A method for augmenting a threaded conversation between a first device and a second device. The method includes: receiving a selection of a selectable animation, via a selection of a selectable animation representation, at the first device, wherein the selectable animation is configured for augmenting the threaded conversation; and incorporating the selection of the selectable animation into the threaded conversation such that the selectable animation appears in a conversation view of the first device and the second device.

20 Claims, 7 Drawing Sheets

(56) References Cited

U.S. PATENT DOCUMENTS

| | | |
|---|---|---|
| 2005/0204309 A1 | 9/2005 | Szeto |
| 2007/0186173 A1* | 8/2007 | Both et al. .................... 715/753 |
| 2008/0122849 A1* | 5/2008 | Wang et al. ................. 345/473 |
| 2008/0266262 A1 | 10/2008 | Duarte et al. |
| 2009/0013265 A1* | 1/2009 | Cole et al. .................... 715/758 |
| 2009/0094512 A1* | 4/2009 | Szeto ........................... 715/234 |
| 2010/0125785 A1* | 5/2010 | Moore ................ G06F 3/04817 715/702 |
| 2011/0249073 A1* | 10/2011 | Cranfill et al. ............ 348/14.02 |
| 2012/0069028 A1 | 3/2012 | Bouguerra |
| 2012/0072856 A1* | 3/2012 | Park et al. .................... 715/752 |
| 2013/0083906 A1* | 4/2013 | Roberts et al. ............ 379/88.13 |
| 2013/0103766 A1* | 4/2013 | Gupta ........................... 709/206 |

OTHER PUBLICATIONS

"PCT/US2013049401 Extended European Search Report", dated Apr. 1, 2016, 7 Pages.

\* cited by examiner

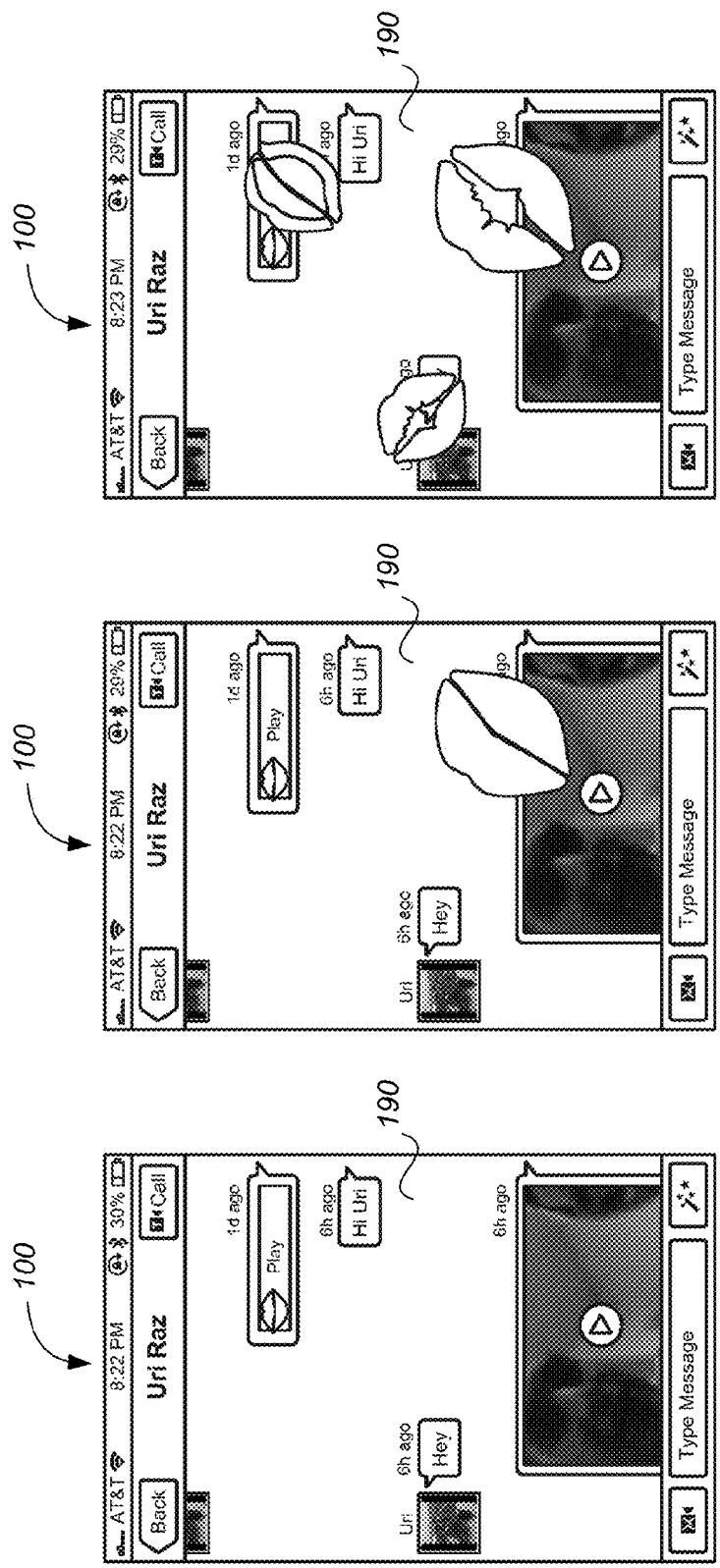

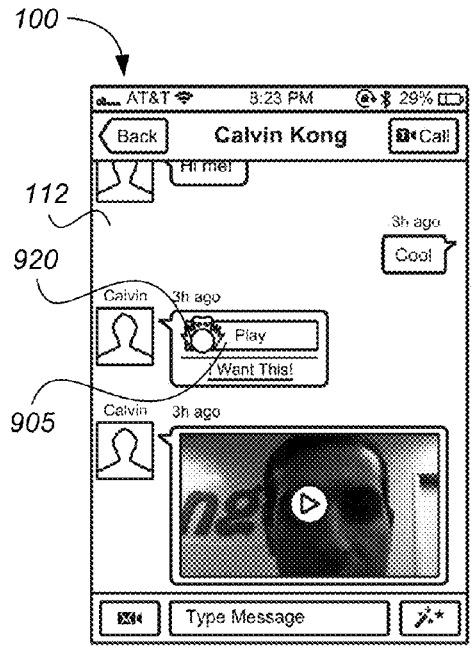
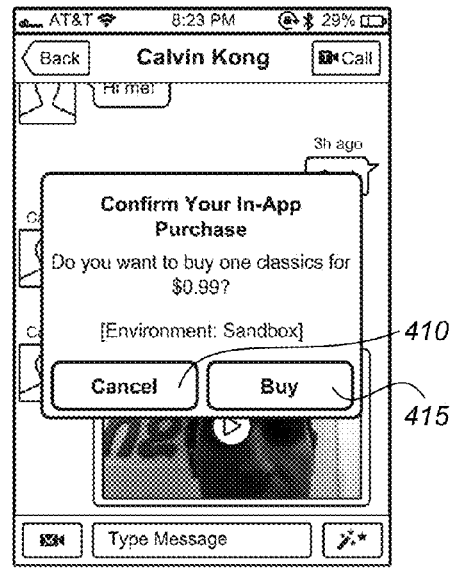
FIG. 4A  FIG. 4B
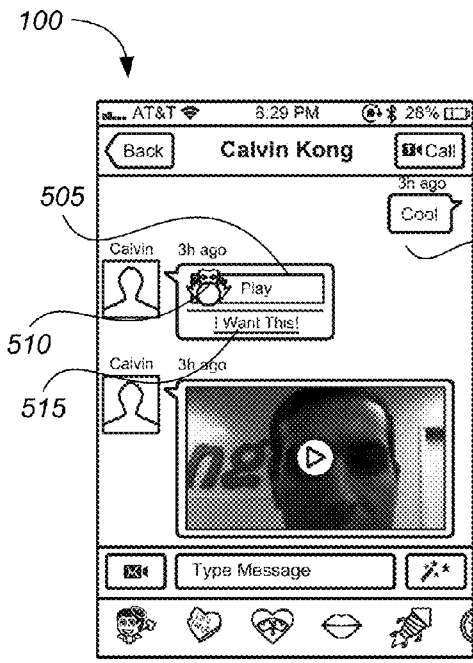
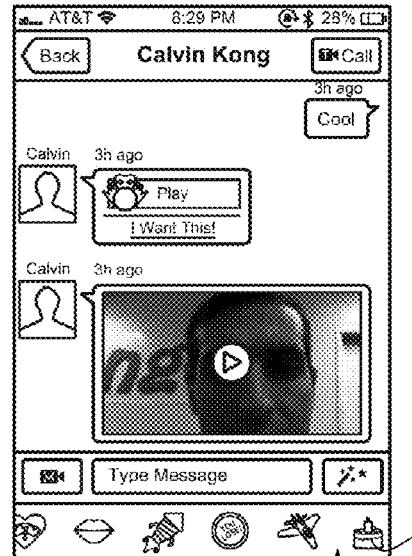
FIG. 5A  FIG. 5B

*600*

```
RECEIVE A SELECTION OF A SELECTABLE ANIMATION, VIA A SELECTION
OF A SELECTABLE ANIMATION REPRESENTATION, AT A FIRST DEVICE,
WHEREIN THE SELECTABLE ANIMATION IS CONFIGURED FOR
AUGMENTING A THREADED CONVERSATION 605
        ↓
INCORPORATE THE SELECTION OF THE SELECTABLE ANIMATION INTO
THE THREADED CONVERSATION SUCH THAT THE SELECTABLE
ANIMATION APPEARS IN A CONVERSATION VIEW OF THE FIRST DEVICE
AND THE SECOND DEVICE 610

DISPLAY A SET OF SELECTABLE ANIMATION REPRESENTATIONS AT THE
FIRST DEVICE 615

DISPLAY A SELECTABLE IMAGE REPRESENTING A SET OF SELECTABLE
ANIMATION REPRESENTATIONS, WHEREUPON, A SELECTION OF THE
SELECTABLE IMAGE RENDERS A DISPLAY OF THE SET OF SELECTABLE
ANIMATION REPRESENTATIONS 620

IN RESPONSE TO RECEIVING A SELECTION OF THE SELECTABLE
    IMAGE, DISPLAY THE SET OF SELECTABLE ANIMATION
    REPRESENTATIONS 625

DISPLAY THE SET OF SELECTABLE ANIIMATION
        REPRESENTATIONS IN AN ANIMATION CONTROL BAR THAT
        REPLACES AN EXISTING CONTROL BAR ON A DISPLAY SCREEN
        OF THE FIRST DEVICE 630

DISPLAY THE SET OF SELECTABLE ANIMATION
        REPRESENTATIONS IN A LIST FORMAT 635

DISPLAY THE SET OF SELECTABLE ANIMATION
        REPRESENTATIONS IN A CAROUSEL FORMAT 640

RECEIVE AN ACTIVATION ACTION FOR THE SELECTABLE ANIMATION;
AND IN RESPONSE TO THE RECEIVED ACTIVATION ACTION, PLAYING
THE ANIMATION 645
    PLAY THE ANIMATION REPEATEDLY IN RESPONSE TO A RECEIPT OF
    REPEATED ACTIVATION ACTIONS 650

DISPLAY AT THE SECOND DEVICE, CONCURRENLTY WITH AN
APPEARANCE OF THE SELECTABLE ANIMATION IN THE CONVERSATION
VIEW, PURCHASING INFORMATION ASSOCIATED WITH A SET OF
SELECTABLE ANIMATION REPRESENTATIONS 655

DISPLAY AT THE FIRST DEVICE, CONCURRENTLY WITH AN APPEARANCE
OF THE SELECTABLE ANIMATION IN THE CONVERSATION VIEW,
PURCHASING INFORMATION ASSOCIATED WITH A SET OF SELECTABLE
ANIMATION REPRESENTATIONS 660
```

```
┌─────────────────────────────────────────────────────────────┐
│ RECEIVE A SELECTION OF A SELECTABLE ANIMATION, VIA A SELECTION │
│ OF A SELECTABLE ANIMATION REPRESENTATION, AT A FIRST DEVICE,  │
│ WHEREIN THE SELECTABLE ANIMATION IS CONFIGURED FOR            │
│ AUGMENTING A THREADED CONVERSATION 705                        │
└─────────────────────────────────────────────────────────────┘
                              │
                              ▼
┌─────────────────────────────────────────────────────────────┐
│ INCORPORATE THE SELECTION OF THE SELECTABLE ANIMATION INTO   │
│ THE THREADED CONVERSATION SUCH THAT THE SELECTABLE           │
│ ANIMATION APPEARS IN A CONVERSATION VIEW OF THE FIRST DEVICE │
│ AND THE SECOND DEVICE 710                                    │
└─────────────────────────────────────────────────────────────┘
                              │
                              ▼
┌─────────────────────────────────────────────────────────────┐
│ DISPLAY, AT THE SECOND DEVICE, PURCHASING INFORMATION        │
│ ASSOCIATED WITH THE SELECTABLE ANIMATION 715                 │
│ ┌─────────────────────────────────────────────────────────┐ │
│ │ DISPLAY, AT THE SECOND DEVICE, CONCURRENTLY WITH AN     │ │
│ │ APPEARANCE OF THE SELECTABLE ANIMATION IN THE           │ │
│ │ CONVERSATION VIEW, THE PURCHASING INFORMATION ASSOCIATED│ │
│ │ WITH THE SELECTABLE ANIMATION 720                       │ │
│ └─────────────────────────────────────────────────────────┘ │
│ ┌─────────────────────────────────────────────────────────┐ │
│ │ DISPLAY AN ANIMATION PACKAGE AVAILABLE FOR A LIMITED    │ │
│ │ NUMBER OF DAYS FOR A COST TO A USER 725                 │ │
│ └─────────────────────────────────────────────────────────┘ │
│ ┌─────────────────────────────────────────────────────────┐ │
│ │ DISPLAY AN ANIMATION PACKAGE AVAILABLE FOR A LIMITED    │ │
│ │ NUMBER OF DAYS FOR NO COST TO A USER 730                │ │
│ └─────────────────────────────────────────────────────────┘ │
│ ┌─────────────────────────────────────────────────────────┐ │
│ │ DISPLAY A FIRST SET OF SELECTABLE PURCHASING INFORMATION│ │
│ │ IMAGES, WHEREUPON IN RESPONSE TO RECEIVING A SELECTION  │ │
│ │ OF THE FIRST SET OF SELECTABLE PURCHASING INFORMATION   │ │
│ │ IMAGES, DISPLAYING A FIRST SET OF DETAILS OF THE        │ │
│ │ PURCHASING INFORMATION 735                              │ │
│ └─────────────────────────────────────────────────────────┘ │
│ ┌─────────────────────────────────────────────────────────┐ │
│ │ DISPLAY A SECOND SET OF SELECTABLE PURCHASING INFORMATION│ │
│ │ IMAGES, WHEREUPON IN RESPONSE TO RECEIVING A SELECTION  │ │
│ │ OF THE SECOND SET OF SELECTABLE PURCHASING INFORMATION  │ │
│ │ IMAGES, DISPLAYING A SECOND SET OF DETAILS OF THE       │ │
│ │ PURCHASING INFORMATION 740                              │ │
│ └─────────────────────────────────────────────────────────┘ │
└─────────────────────────────────────────────────────────────┘

┌─────────────────────────────────────────────────────────────┐
│ DISPLAY, AT THE FIRST DEVICE, THE PURCHASING INFORMATION     │
│ ASSOCIATED WITH THE SELECTABLE ANIMATION 745                 │
│ ┌─────────────────────────────────────────────────────────┐ │
│ │ DISPLAY, AT THE FIRST DEVICE, CONCURRENTLY WITH AN      │ │
│ │ APPEARANCE OF THE SELECTABLE ANIMATION IN THE           │ │
│ │ CONVERSATION VIEW, THE PURCHASING INFORMATION ASSOCIATED│ │
│ │ WITH THE SELECTABLE ANIMATION 750                       │ │
│ └─────────────────────────────────────────────────────────┘ │
└─────────────────────────────────────────────────────────────┘
```

*FIG. 7*

ANIMATION IN THREADED CONVERSATIONS

CROSS REFERENCE TO RELATED APPLICATIONS

This application claims priority to and benefit of U.S. Patent Application No. 61/668,811 filed on Jul. 6, 2012 entitled "ANIMATION IN THREADED CONVERSATIONS" by Setton et al., assigned to the assignee of the present application, and incorporated herein in its entirety.

BACKGROUND

Participants using a messaging application communicate with one another by transmitting text messages, e-mails, etc. For example, participants are able to interact via mobile devices while sending and receiving messages. However, the participants may not be able to completely articulate what they are attempting to communicate to one another based solely on the transmitted texts.

BRIEF DESCRIPTION OF THE DRAWINGS

FIGS. 3A, 3B, and 3C illustrate the showing and playing of an animation in a threaded conversation in the conversation view on the display screen, in accordance with an embodiment.

FIGS. 4A and 4B illustrate a selectable animation for playing and selectable options for purchasing an animation, respectively, in accordance with an embodiment.

FIGS. 5A and 5B illustrate a selectable animation for selecting and playing and the animation display bar 192 (described herein as scrollable, in various embodiments), in accordance with an embodiment FIG. 6 illustrates an example of a method for placing animations in a threaded conversation, in accordance with embodiments.

FIG. 7 illustrates an example of a method for placing animations in a threaded conversation, in accordance with embodiments.

Figure 1:
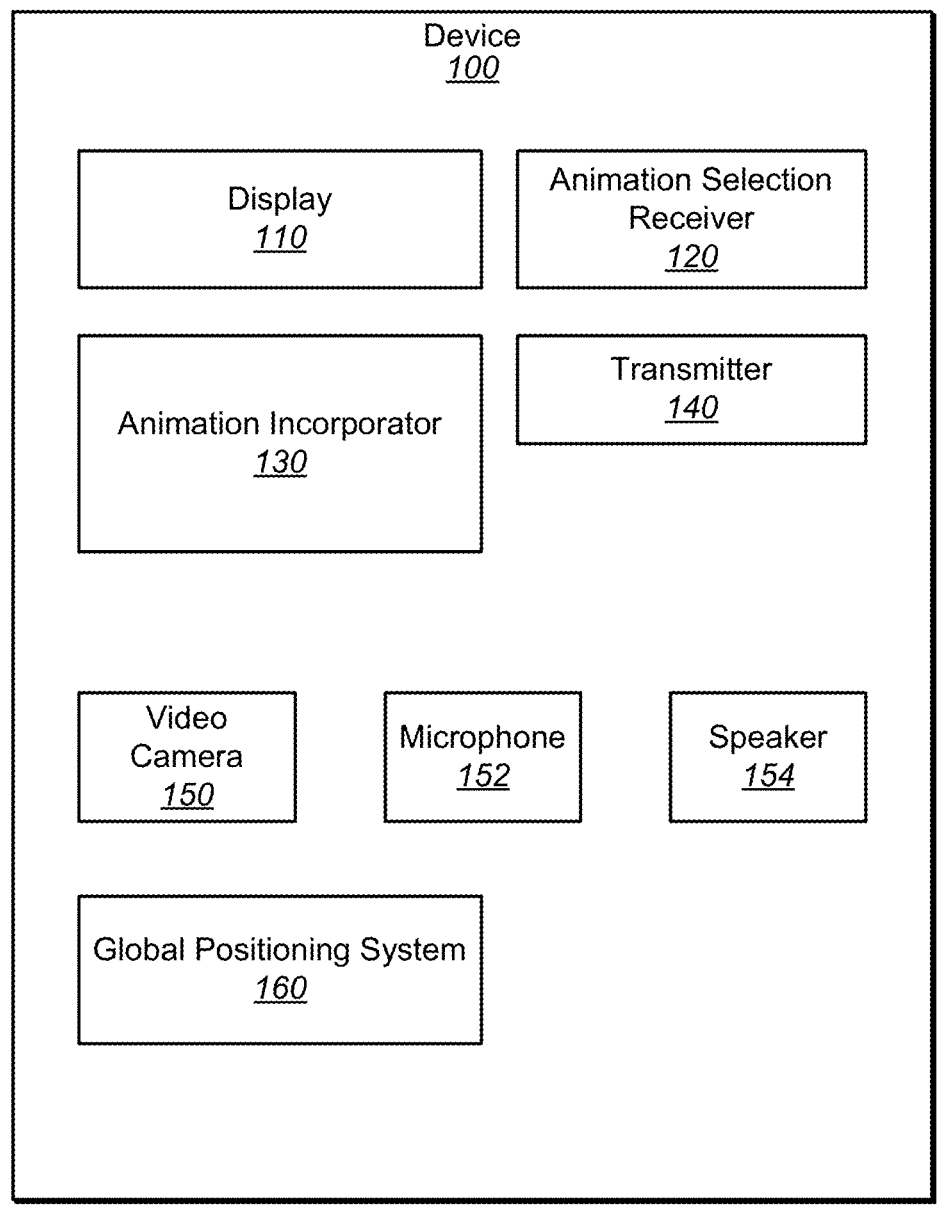
FIGS. 1, 2A, and 2B illustrate examples of devices, in accordance with embodiments.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

Embodiments enable the user of a first device to integrate an animation into a threaded conversation and send this animation to a user of a second device. In a threaded conversation, messages are visually grouped in a hierarchy by topic, with any replies to a message arranged visually near to the original message. The threaded conversation is a feature used by various forums, such as, but not limited to: emailing; texting; bulletin boards; newsgroups; and Internet. Further, within a threaded conversation, at least text messages, video and audio may be communicated between participants. The threaded conversation (including text messages, video and/or audio messages) appears in a conversation view on the display screen of the device. Embodiments enable the combining of audio/video animations with text and/or audio/video messages in a threaded conversation model between multiple users for communication purposes.

Further, embodiments provide that the animation delivered to another participant be represented to the receiving participant by a clickable (selectable) graphic. Once the receiving participant clicks on the clickable graphic, the animation plays as an overlay on the threaded conversation in the conversation view. Further, the sending participant may also click on a clickable graphic in his conversation view, such that the animation plays upon clicking the graphic.

Embodiments provide that both the sending and the receiving participant r may replay the animation (repeatedly, if so desired). Further, the animations may be purchased directly from the conversation view of the participants. Embodiments enable the purchase of the animations by displaying a clickable pictogram or link next to the clickable graphic representing the animation.

Embodiments further provide a scrollable selector to enable the selection of an animation of a set of animations. Further, these selectable animations may be shared with other participants in the threaded conversation.

Figure 2A:
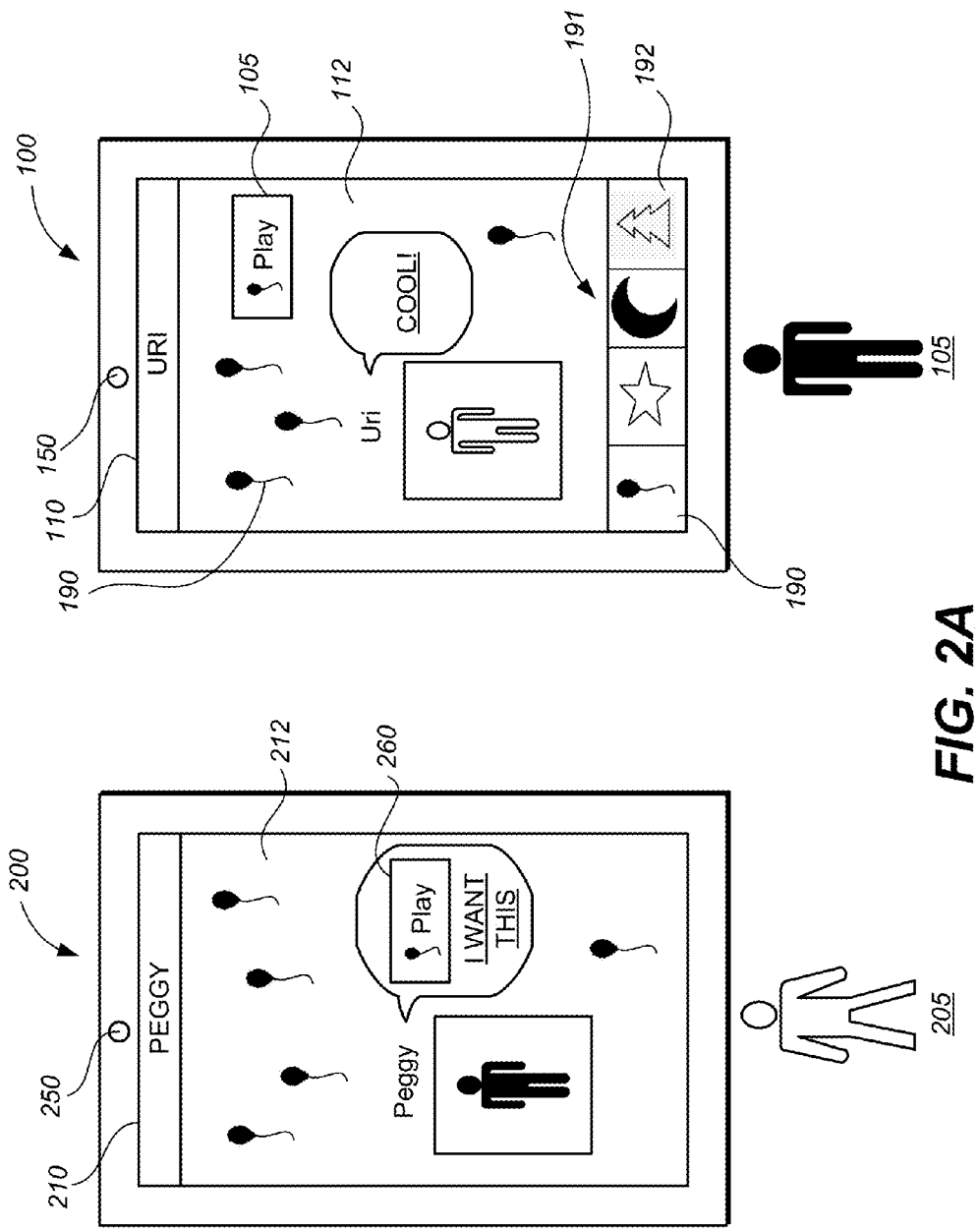
Figure 2B:
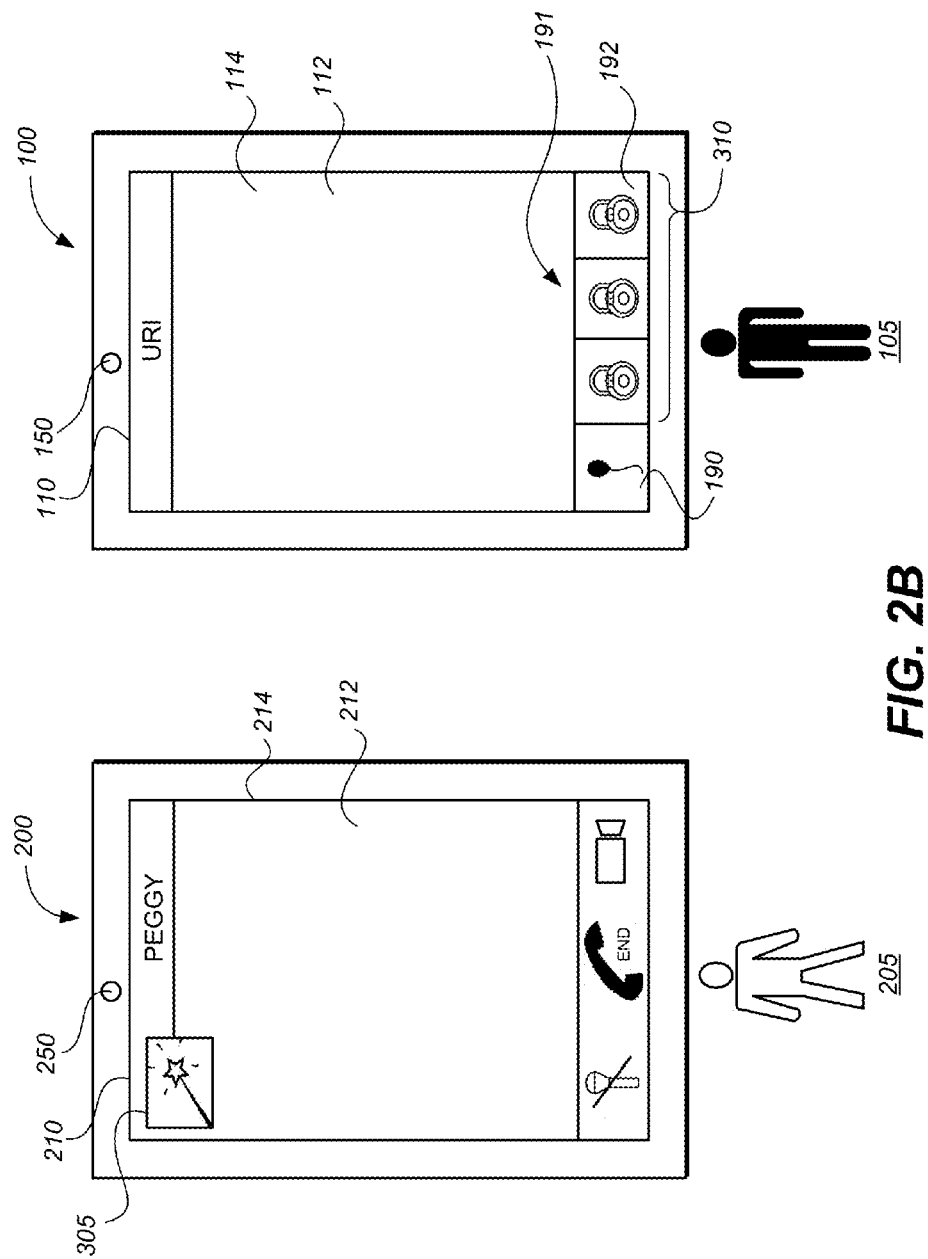

FIG. 1 depicts an embodiment of device 100. Device 100 is configured for participation in a video conference. FIGS. 2A and 2B depict devices 100 and 200 participating in a video conference. In general, video conferencing allows two or more locations to interact via multi-way video and audio transmissions simultaneously.

The discussion below will first describe the components of device 100. The discussion will then describe the functionality of the components of device 100 during a video conference and/or a threaded conversation, between devices 100 and 200. Devices 100 and 200 are any communication devices (e.g., laptop, desktop, smartphones, tablets, TV, etc.) capable of participating in a threaded conversation, or a video conference and a threaded conversation. In various embodiments, device 100 is a hand-held mobile device, such as smart phone, personal digital assistant (PDA), and the like.

Moreover, for clarity and brevity, the discussion will focus on the components and functionality of device 100. However, device 200 operates in a similar fashion as device 100. In one embodiment, device 200 is the same as device 100 and includes the same components as device 100.

Device 100 includes display 110, animation selection receiver 120, animation incorporator 130, transmitter 140, camera 150, microphone 152 and speaker 154. Device 100 optionally includes global positioning system 160.

Display 110 is configured for displaying messages captured at video captured at device 200. In another embodiment, display 110 is further configured for displaying video captured at device 100.

Animation selection receiver 120 is configured to access a selectable animation. The selectable animation is configured for augmenting a threaded conversation (the selectable animation will be described in detail below). For example, if the user 105 of the device 100 is participating in a text messaging conversation with user 205 of the device 200, then the text conversation may appear on the display 110 (as that display screen shown in FIG. 3A) of device 100, and display 210 of device 200.

Animation incorporator 130 is configured for incorporating the selection of the selectable animation 190 into the threaded conversation. For example, animation incorporator 130 is configured for incorporating the selectable animation into a text message appearing at device 100 and/or device 200. Animation incorporator 130 also is configured for incorporating the selection of the selectable animation 190 into a shared audio/video.

Transmitter 140 is for transmitting data (e.g., animation, control code).

Optionally, device 100 includes one or more of the following: a video camera 150; a microphone 152; a speaker 154; and a global positioning system 160. Video camera 150 is for capturing video at device 100. Microphone 152 is for capturing audio at device 100. Speaker 154 is for generating an audible signal at device 100.

Global positioning system 160 is for determining a location of a device 100.

As will be described herein below, FIGS. 3A, 3B, and 3C illustrate the showing and playing of an animation in a threaded conversation in the conversation view on the display screen, in accordance with an embodiment.

Referring now to FIG. 2A, devices 100 and 200 are participating in threaded conversation (and possibly a video conference) with one another. In various embodiments, more than two devices participate in a threaded conversation with each another.

During the threaded conversation, video camera 250 captures video at device 200. For example, video camera 250 captures video of user 205 of device 200.

Video camera 150 captures video at device 100. For example, video camera 150 captures video of user 105. It should be appreciated that video cameras 150 and 250 capture any objects that are within the respective viewing ranges of cameras 150 and 250.

Microphone 152 captures audio signals corresponding to the captured video signal at device 100. Similarly, a microphone of device 200 captures audio signals corresponding to the captured video signal at device 200.

The video captured at device 200 is transmitted to and displayed on display 110 of device 100. For example, a video of user 205 is displayed on a first view 112 of display 110. Moreover, the video of user 205 is displayed on a view 214 of display 210. Referring to FIGS. 3A-3C, the view of the user 205 displayed on the first view 112 of the display 110 may be at the box designated for the still photo or live video of the user 205, Uri. Similarly (but not shown in FIGS. 3A-3C), the view of the user 105 displayed on the second view 212 of the display 210 may be at the box designated of the still photo or live photo of the user 105, Peggy.

Thus, the messages (and video, in some instances) captured at device 100 is transmitted to and displayed on display 210 of device 200.

In one embodiment, the audio signals captured at devices 100 and 200 are incorporated into the captured video. In another embodiment, the audio signals are transmitted separate from the transmitted video.

Animation selection receiver 120 receives a selection of a selectable animation 190, via receiving a selection of a selectable animation representation (e.g., an image representing an animation), for integrating into the threaded conversation. An animation is a simulation of movement created by displaying a series of pictures, or frames. In embodiments, animations themselves can be received at device 100 from a server or device 200 and animations can be received at different times. For example, animations can be received when an augmenting application is downloaded onto device 100, during login, or in real-time, when the animations are instructed to be incorporated into the video conference. Further, by not limited to, animations can be received by being downloaded with a video conferencing application, by being downloaded with a messaging application, by being downloaded later on as part of a selection (e.g., digital catalog), by being downloaded during a call, by being downloaded when the user interacts with the application, and by being downloaded when the application is updated.

The set of selectable animation representations 191 that are depicted in FIGS. 2A and 6 (e.g., star, palm tree, flower, rain cloud) are merely a few of any number of examples of animations. It should be appreciated that the set of selectable animation representations 191 may include one or more selectable animation representations. It should be appreciated that an animation can be any object that is capable of augmenting a threaded conversation. In other words, an animation can be any object that is able to supplement the communication between participants in a threaded conversation model. For example, animations can be, but are not limited to, a kiss, heart, emoticon, high-five, background (photo-booth type of effects), color space changes, and/or image process changes (e.g., thinning, fattening), or avatars.

It should also be appreciated that the animation is not limited to a viewable animation. For example, an animation can be one of a plurality of sounds, or sounds and video. Additionally, the animations may not necessarily be pre-determined. For example, the displaying of the animations may be a result of an interaction with the user of the application.

In one embodiment, the set of selectable animation representations 191 are displayed on display 110 for viewing by user 105. For example, the set of selectable animation representations 191 are displayed on the animation display bar 192. In one embodiment, the animation display bar 192 is overlaid with first view 112. In another embodiment, the animation display bar 192 is displayed concurrently with first view 112 and/or second view 212.

In various embodiments, the animation display bar 192 is displayed in response to user input, such as, but not limited to key stroke, cursor movement, a detected touch on a touch screen, and designated movement by a user (e.g., expressions, winking, blowing a kiss, hand gesture and the like).

Animation incorporator 130 facilitates in incorporating selectable animation 190 into the threaded conversation. With reference now to FIGS. 3A, 3B, and 3C, a threaded conversation is shown on a display screen, and integrated therein is a representation of a selected animation. With reference to FIG. 3A, a conversation is taking place between Uri and Peggy. Peggy, the user 105, is holding the device 100. The threaded conversation includes texts, and video. Further, Peggy is able to look at Uri, live, while texting him. Peggy searches through her set of selectable icons and chooses a pair of lips to send to Uri. Peggy sees her selection of the set of lips appear on the right side of the display screen. More specifically, an icon representing Peggy's selected animation appears on the "Play" button. By pushing the play button, Peggy may view the animation that she has sent to Uri. When Peggy taps on the "Play" button, she sees several pairs of lips, overlaid on and moving across the display screen 110. With regard to Uri, user 205 of device 200, the "Play" button has also appeared on his display screen 210, along with the animation representation of the pair of lips. If Uri taps on the "Play" button, the pair of lips will be overlaid on and move across the display screen 210.

It should be noted that various embodiments enable the animation to be pre-programmed to appear only in specific regions of the display screen.

FIG. 2A depicts the selectable animation 190 incorporated into the threaded conversation. However, it should be appreciated that any number of selectable animations can be incorporated into the threaded conversation model at any time. For example, five different animations, represented by selectable animation representations, which are selected from the set of selectable animation representations, may be concurrently incorporated into the threaded conversation model.

It should be appreciated that the term "incorporate" used herein, is used to describe that a selectable animation 190 is merely displayed along with some portion of the threaded conversation. As such, the selectable animation 190 is merely displayed concurrently with some portion of the threaded conversation.

Referring still to FIG. 2A, Peggy, user 105, chose the selectable animation 190 (balloons) to send to Uri. Peggy's display screen 110 shows that Peggy has selected the balloons, via the "Play" button 105 appearing on in the threaded conversation. Concurrently, a "Play" button also appears on Uri's display screen 210. If/when Uri presses the "Play" button, a set of balloons appears to float across the display screen 210 of device 200, as well as across the display screen 110 of device 100. In one embodiment, the selectable animation 190 is superimposed as an overlay on the display screen showing the threaded conversation. As such, a selectable animation 190 is concurrently superimposed as an overlay displayed on devices 100 and 200. For example, a selectable animation 190 is concurrently overlaid on the conversation view displayed in view 112 and view 212 (as depicted in FIG. 2A).

In another embodiment, when the user 205 selects the animation for playing at the selectable "Play" button 260, while the animation is displayed on the second view 212, it is not displayed on the first view 112.

FIG. 2B illustrates an example device in accordance with embodiments. Selectable image 305 is an image that may be selected (via touch), thereby rendering a set of selectable animation representations 191 in the animation display bar 192.

FIGS. 4A and 4B illustrate a selectable animation for playing as well as selectable options for purchasing an animation, respectively, in accordance with an embodiment. In FIGS. 4A and 4B, the user 105 of device 100 is Sarah; a threaded conversation between Sarah and Calvin Kong is being shown in FIGS. 4A and 4B. Calvin Kong wrote, "Hi me!". Sarah messaged back, "Cool". Calvin Kong selected an animation to send to Sarah and sent the animation. The ability to play the animation, through the "Play" graphic 405, appears in the conversation view in the first view 112. Sarah may click on the "Play" button 405 to display the animation on the first view 112. Additionally, Sarah may click on the clickable link, "I Want This!", in order to purchase the animation. It should be appreciated that the clickable link may contain any language or visual indication that is able to be activated in order to move to the purchasing window of FIG. 4B. FIG. 4B illustrates what happens after Sarah clicks on the "Play" button 405. Sarah receives, in the first view 112, selectable options of "Cancel" 410 or "Buy" 415. Further, as shown, the information that appears on the first view 112 also states, "Confirm Your In-App Purchase", "Do you want to buy one classics for $0.99?", and "[Environment: Sandbox]". Sarah has the option to cancel her purchase of the animation represented by the icon 420 shown in FIG. 4A or buy the animation. Once bought, Sarah may share the animation innumerable times with other conversation participants.

FIGS. 5A and 5B illustrate a selectable animation for selecting and playing and the animation display bar 192 (described herein as scrollable, in various embodiments), in accordance with an embodiment. In FIGS. 5A and 5B, the user 105 of device 100 is Sarah; a threaded conversation between Sarah and Calvin Kong is being shown in FIGS. 5A and 5B. In this example, Calvin Kong has sent an animation to Sarah's device. Sarah may click on the "Play" button 505 in order to play the animation. The animation is represented by a graphic 510. Upon clicking the "Play" button 505, the animation will appear (not shown) on the first view 112 of the device 100, overlaid on the threaded conversation. Additionally, Sarah may purchase the animation by clicking on the link, "I Want This" 510. Sarah may also select an animation from the animation display bar 192. To find the animation that she wants, Sarah may scroll through the selectable animation representations 191. FIG. 5B illustrates the movement of the selectable animations on the animation display bar 191 (compare the positions of the selectable animation representations 191 of the animation display bar 192 shown in FIG. 5A). Sarah may then activate the selectable animation by clicking on the selectable animation representation 192. The selected animation will then appear in the threaded conversation for both Calvin Kong and Sarah to activate through each person's respective "Play" buttons. (It should be appreciated that the "Play" button is used herein only as an example. The means by which the user may activate the animation may be any visual means providing the capability to do so.)

It should be noted that the various embodiments described herein can also be used in combination with one another. That is one described embodiment can be used in combination with one or more other described embodiments.

In one embodiment, transmitter 140 transmits the selected animation to device 200 (hereinafter, also known as the "second device 200") such that the threaded conversation between the first device 100 and the second device 200 includes the selectable animation 190 is displayed on display 210.

In a further embodiment, selectable animation 190 is directionally manipulated. For example, user 105 sends a "punch" animation (e.g., fist, boxing glove) to user 205. Accordingly, user 105 views the "punch" animation going into display 110 and user 205 views the "punch" animation coming out of display 210.

In one embodiment, the set of selectable animation representations 191 are not displayed on display 110 and/or animation display bar 192 until there is at least one of a variety of inputs, as described above. For example, an animation of a heart is not displayed until there is tapping on a touch screen (e.g., the "Play" button 505).

Any number of animations can be accessed and/or selected to be incorporated into the threaded conversation. In one embodiment, the set of selectable animation representations 191 are geographical-related animations. For example, the set of selectable animations 191 are based on a location of devices 100 and/or 200.

In particular, if device 100 is located in Hawaii, then the set of selectable animation representations 191 are related to that location. For example, geographical-related animations, based on a location in Hawaii determined from GPS 160, could be, but are not limited to, a surfboard, sun, palm tree, coconut, etc.

It should be appreciated that the determination of location can be provided in a variety of ways. For example, the determination of a location of a device can be based on information provided by a user upon registrations, an IP address of the device or any other method that can be used to determine location.

In another embodiment, the set of selectable animations 191 are temporal-related animations based on a time of the threaded conversation. For example, if the threaded conversation occurs on or around Christmas, then animations would be Christmas related (e.g., stocking, Christmas tree, candy cane, etc.). In another example, if the threaded conversation occurs in the evening, then animations would be associated with the evening (e.g., moon, stars, pajamas, etc.)

In a further embodiment, the set of selectable animation representations 191 are culturally-related animations. For example, if user 105 and/or user 205 are located in Canada, then the set of selectable animation representations 191 could be, but are not limited to, a Canadian flag, hockey puck, curling stone, etc.

In yet another embodiment, the set of selectable animation representations 191 is available and/or accessed based on account status. For example, user 105 has a payable account to have access to the set of selectable animation representations 191. If user 105 has provided adequate payment to the account, then user 105 is able to access the set of selectable animation representations 191. In contrast, if user has not provided adequate payment to the account, then user 105 is unable to access the set of selectable animation representations 191.

Moreover, the use and selection of animations can be specifically related to events, holidays, special occasions and the like. Holidays can be, but are not limited to, religious holidays (e.g., Christmas, Easter, Yom Kippur, etc.), national holidays (e.g., New Years, Presidents Day, Memorial Day, etc.) or any other observed holiday (official or unofficial). Events or special occasions can be, but are not limited to, birthdays, anniversaries, graduation, weddings, new job, retirement and the like.

In one example, on or around Thanksgiving, animations of a turkey, pumpkin pie, a Pilgrim and the like are selected and/or used. In another example, on or around St. Patrick's Day, animations of a shamrock, a pot of gold, and a leprechaun are selected and/or used. In a further example, on or around Easter, animations of an Easter bunny and Easter eggs are selected and/or used.

In one embodiment, a user is prompted (by a prompt) to utilize an animation specifically related to events, holidays, special occasions and the like. (It should be understood that the term "prompt" used herein may be any functionality that provides for serving to suggest or remind a user of an action that may be taken. In one embodiment, a prompt may be a pop-up that suggests an action that may be taken. The pop-up may appear in response to a keystroke or another action taken by a user. In another embodiment, a prompt may be a button or the like [that is not a pop-up] that displays text. The button or the like may be displayed during the entirety a particular screen that is presented to the user.)

For example, on or around the Fourth of July, a user is prompted to select and/or use animations (e.g., fireworks) specifically related to the Fourth of July. In particular, the animations are presented to a user and the user is prompted to send the animations to another user in the threaded conversation.

In another embodiment, a user can be prompted to send an animation to another user where a relationship between the parties is suspected, known, or inferred. For example, a mother is communicating with her son via texting. If the mother/son relationship is suspected, known, or inferred, then the son is prompted to utilize animations (e.g., flowers) specifically related to Mother's Day.

The relationship can be determined in a variety of ways. For example, the relationship can be determined based on, but not limited to, surname, location of users, call logs, etc.

Moreover, the son may be prompted with a message, such as "This appears to be your mother. Is this correct?" As such, if the son responds that he is communicating with his mother, then the son is prompted to utilize animations (e.g., flowers) specifically related to Mother's Day.

It should also be appreciated that animations can enhance revenue stream. For example, 100,000 animations are used on Valentine's Day, and there is a $0.50 fee for each animation. As a result, $50,000 in fees is accumulated on Valentine's Day.

FIGS. 6 and 7 depict flow charts of methods 600 and 700, in accordance with embodiments, respectively. In various embodiments, methods 600 and 700 are carried out by processors and electrical components under the control of computer readable and computer executable instructions. The computer readable and computer executable instructions reside, for example, in a data storage medium such as computer usable volatile and non-volatile memory. However, the computer readable and computer executable instructions may reside in any type of computer readable storage medium. In some embodiments, methods 600 and 700 are performed by devices 100 and/or device 200, as described in FIGS. 1 through 5.

With reference now to FIGS. 1-6, at 605 of method 600, a selection of a selectable animation 190 is received at device 100 (hereinafter, also known as the "first device 100") via a selection of a selectable animation representation. The selectable animation 190 augments the threaded conversation. At 610 of method 600, the selection of the selectable animation 190 is incorporated into the threaded conversation, such that the selectable animation appears in a conversation view of the first device 100 and the second device 200.

In one embodiment, at 615 of method 600, the selectable image 305 is displayed and represents a set of selectable animation representations 191. Further, in one embodiment, at 620 of method 600, a selectable image 305 representing a set of selectable animation representations 191, is displayed, whereupon a selection of the selectable image 305 renders a display of the set of selectable animation representations 191. At 625 of method 600, in response to receiving a selection of the selectable image 305, the set of selectable animation representations 191 is displayed.

In one embodiment, the displaying of the set of selectable animation representations at operation 625 includes one or more of the following: displaying 630 the set of selectable animation representations 191 in an animation control bar 192 that replaces an existing control bar on a display screen of the first device 100; displaying 635 the set of selectable animation representations 191 in a list format; and displaying 640 the set of selectable animation representations 191 in a carousel format.

In one embodiment, the list format is scrollable. In one embodiment, the carousel format noted above is a format of presenting the set of selectable animation representations 191 such that a finger swipe from one side of the animation control bar 192 to the other moves the set of selectable animation representations 191 further to one side such that animations that were at first hidden appear on the screen while the animations that had originally appeared on the screen become hidden. Furthermore, in one embodiment, when an end of a list in the carousel is reached, the list starts over again from the beginning.

Further, in one embodiment, a search may be made for a desired animation through typing in, or voice activating a search having a particular topic.

In another embodiment, a set of selectable animation representations 191 may be displayed at the first device 100, without being displayed in an animation control bar 192.

In one embodiment, at operation 645 of method 600, an activation action for the selectable animation is received, and in response to receiving the activation action, the animation is played. The activation action is one in which a user performs an action to the device such that the device plays the animation. In one embodiment, at operation 650 of method 600, the animation is repeatedly played in response to a receipt of repeated activation actions.

In one embodiment, at 655 of method 600, concurrently with an appearance of the selectable animation in the conversation view, purchasing information associated with the set of selectable animation representations 191 is displayed at the second device 200, as will be described herein. In yet another embodiment, at 660 of method 600, concurrently with an appearance of the selectable animation in the conversation view, purchasing information associated with the set of selectable animation representations 191 is displayed at the first device 100, as will be described herein.

With reference now to FIGS. 1-7, in one embodiment, at 705 of method 700, a selection of a selectable animation 190 is received, wherein the selectable animation 190 is configured for augmenting the threaded conversation. In one embodiment, at 710 of method 700, the selection of the selectable animation into the threaded conversation is incorporated such that the selectable animation appears in a conversation view of the first device 100 and the second device 200. In one embodiment, at 715 of method 700, purchasing information associated with the selectable animation 190 is displayed at the second device 200. In one embodiment, at operation 745 of method 700, the purchasing information associated with the selectable animation is displayed at the first device.

Various embodiments are thus described. While particular embodiments have been described, it should be appreciated that the embodiments should not be construed as limited by such description, but rather construed according to the following claims.

What we claimed is:

1. A computer-implemented method for augmenting a threaded conversation between a first device and a second device, said method comprising:
   displaying a selectable picture image representing a set of selectable animation representations, whereupon, a selection of said selectable picture image renders a display of said set of selectable animation representations,
   said selectable picture image includes only an image without alphanumeric text;
   receiving a selection of a selectable animation, via said selection of said selectable animation representation of said set of selectable animation representations, at a touch screen display of said first device,
   said selectable animation augmenting said threaded conversation,
   each selectable animation, in said selection of the selectable animation representations, being location specific selectable animation determined based on a location of the first device;
   incorporating said selection of said selectable animation into said threaded conversation such that said selectable animation appears in a conversation view of said first device and said second device,
   said selectable animation is superimposed as an overlay on said threaded conversation such that said selectable animation is concurrently superimposed and overlaid upon said conversation view of said threaded conversation; and
   displaying at said second device, purchasing information for said location specific selectable animation.

2. The computer-implemented method of claim 1, further comprising:
   displaying a set of selectable animation representations at said first device.

3. The computer-implemented method of claim 1, further comprising:
   in response to receiving a selection of said selectable picture image, displaying said set of selectable animation representations.

4. The computer-implemented method of claim 3, wherein said displaying said set of selectable animation representations comprises:
   displaying said set of selectable animation representations in an animation control bar that replaces an existing control bar on a display screen of said first device.

5. The computer-implemented method of claim 3, wherein said displaying said set of selectable animation representations comprises:
   displaying said set of selectable animation representations in a list format.

6. The computer-implemented method of claim 3, wherein said displaying said set of selectable animation representations comprises:
   displaying said set of selectable animation representations in a carousel format.

7. The computer-implemented method of claim 1, further comprising:
   receiving an activation action for said selectable animation; and
   in response to receiving said activation action, playing said selectable animation.

8. The computer-implemented method of claim 7, further comprising:
   playing said selectable animation repeatedly in response to a receipt of repeated activation actions.

9. The computer-implemented method of claim 1, further comprising:
   displaying at said second device, concurrently with an appearance of said selectable animation in said conversation view, the purchasing information associated with a set of selectable animation representations.

10. The computer-implemented method of claim 1, further comprising:

displaying at said first device, at an end of a video conference, concurrently with an appearance of said selectable animation in said conversation view, purchasing information associated with a set of selectable animation representations.

11. A first device for participation in a threaded conversation, said first device comprising:
a touch screen display disposed on said first device for displaying a threaded conversation with a second device, for displaying a selectable picture image, and for receiving user input;
one or more processors;
a non-transitory computer-readable storage medium containing instructions which when executed on the one or more processors, cause the one or more processors to perform operations including:
displaying said selectable picture image representing a set of selectable animation representations, whereupon, a selection of said selectable picture image renders a display of said set of selectable animation representations,
said selectable picture image includes only an image without alphanumeric text;
receiving a selection of a selectable animation at said touch screen display, via a selection of a selectable animation representation,
said selectable animation augmenting said threaded conversation,
each selectable animation, in said selection of the selectable animation representations, being location specific selectable animation determined based on a location of the first device;
incorporating said selection of said selectable animation into said threaded conversation appearing at said second device,
said selectable animation is superimposed as an overlay on said threaded conversation;
transmitting said threaded conversation comprising said selection of said selectable animation,
said threaded conversation comprising said selection is displayed in a conversation view at said second device such that said selectable animation is concurrently superimposed and overlaid upon said conversation view of said threaded conversation; and
displaying at said second device, purchasing information for said location specific selectable animation.

12. The device of claim 11, further comprising:
a video camera.

13. The device of claim 11, further comprising:
a microphone.

14. A non-transitory computer-readable storage medium having instructions stored thereon which, when executed, cause a computer processor to perform a method of:
displaying, at a touch screen display of a first device, a selectable picture image representing a set of selectable animation representations, whereupon, a selection of said selectable picture image renders a display of said set of selectable animation representations,
said selectable picture image includes only an image without alphanumeric text;
receiving a selection of a selectable animation, via said selection of said selectable animation representation, at said touch screen display of said first device,
said selectable animation augmenting a threaded conversation,
each selectable animation, in said selection of the selectable animation representations, being location specific selectable animation determined based on a location of the first device;
incorporating said selection of said selectable animation into said threaded conversation such that said selectable animation appears in a conversation view of said first device and a second device,
said selectable animation is superimposed as an overlay on said threaded conversation such that said selectable animation is concurrently superimposed and overlaid upon said conversation view of said threaded conversation; and
displaying, at said second device and concurrently with the appearance of said selectable animation in said conversation view, purchasing information for said location specific selectable animation.

15. The non-transitory computer-readable storage medium of claim 14, further comprising instructions for:
displaying, at said first device, said purchasing information associated with said selectable animation.

16. The non-transitory computer-readable storage medium of claim 15, wherein said displaying, at said first device, said purchasing information associated with said selectable animation comprises:
displaying, at said first device, concurrently with an appearance of said selectable animation in said conversation view, said purchasing information associated with said selectable animation.

17. The non-transitory computer-readable storage medium of claim 14, wherein said displaying, at said second device, said purchasing information associated with said selectable animation comprises:
displaying an animation package available for a limited number of days for a cost to a user.

18. The non-transitory computer-readable storage medium of claim 14, wherein said displaying, at said second device, said purchasing information associated with said selectable animation comprises:
displaying an animation package available for a limited number of days for no cost to a user.

19. The non-transitory computer-readable storage medium of claim 14, wherein said displaying, at said second device, purchasing information associated with said selectable animation comprises:
displaying a first set of selectable purchasing information images, whereupon in response to receiving a selection of said first set of selectable purchasing information images, displaying a first set of details of said purchasing information.

20. The non-transitory computer-readable storage medium of claim 14, wherein said displaying, at said second device, purchasing information associated with said selectable animation comprises:
displaying a second set of selectable purchasing information images, whereupon in response to receiving a selection of said second set of selectable purchasing information images, displaying a second set of details of said purchasing information.

* * * * *